US005740372A

United States Patent [19]
Hijino

[11] Patent Number: 5,740,372
[45] Date of Patent: Apr. 14, 1998

[54] CIRCUIT WHICH DETECTS A SIGNAL IN SUCCESSIVE FRAMES BY FEEDING BACK LOOK UP DATA WITH ONE FRAME DELAY AS ADDRESSES TO LOOK UP MEMORY

[75] Inventor: Keiichiro Hijino, Tokyo, Japan

[73] Assignee: Oki Electric Industry Co., Ltd., Tokyo, Japan

[21] Appl. No.: 526,213

[22] Filed: Sep. 11, 1995

[30] Foreign Application Priority Data

Sep. 26, 1994 [JP] Japan ................... 6-229410

[51] Int. Cl.⁶ ................ G06F 15/163; G06F 13/00
[52] U.S. Cl. ............... 395/200.61; 395/200.62; 395/200.66; 395/200.78; 395/421.11; 395/898; 370/506; 370/509; 370/513
[58] Field of Search ............... 395/793, 200.61, 395/200.62, 200.66, 200.78, 421.11, 898; 370/510, 512, 505, 363, 509, 506, 513; 340/825.2; 375/354, 293, 254, 362

[56] References Cited

U.S. PATENT DOCUMENTS

| | | |
|---|---|---|
| 4,301,534 | 11/1981 | Genter ........................ 370/510 |
| 4,596,981 | 6/1986 | Ueno et al. .................. 340/825.2 |
| 4,920,546 | 4/1990 | Iguchi et al. .................. 375/354 |
| 4,984,249 | 1/1991 | Long et al. ................... 375/293 |
| 5,113,395 | 5/1992 | Murakami et al. ........... 370/505 |
| 5,335,228 | 8/1994 | Bottiglieri et al. ........... 370/512 |
| 5,367,543 | 11/1994 | Uomoto ........................ 395/793 |
| 5,526,297 | 6/1996 | Snyder, Jr. et al. ........... 364/715.11 |

*Primary Examiner*—Thomas C. Lee
*Assistant Examiner*—Ki S. Kim
*Attorney, Agent, or Firm*—Rabin, Champagne, & Lynt, P.C.

[57] ABSTRACT

A signal detection circuit receives a data stream containing a signal to be detected and detects the contained to-be-detected signal. The signal detection circuit includes a memory circuit prestoring data for detecting the to-be-detected signal, a first data feeder for feeding data to the memory circuit per given time slot as an upper address, and a second data feeder for feeding data to the memory circuit as a lower address using data outputted from the memory circuit. The memory circuit outputs data stored in a storage area defined by the upper address and the lower address fed from the first and second data feeders, respectively. By arranging the memory circuit to output a given value as the foregoing output data when the to-be-detected signal is detected, detection of the to-be-detected signal is achieved.

15 Claims, 6 Drawing Sheets

| FRAME | CONTROL SIGNAL | |
|---|---|---|
| | BIT | HEXADECIMAL |
| 0 | 1 1 1 1 | F |
| 1 | 0 0 0 0 | 0 |
| 2 | 1 0 1 0 | A |
| 3 | 0 1 0 1 | 5 |

FIG. 3

| | ROM LOWER ADDRESS (3BITS) HEXADECIMAL | | | | | | | |
|---|---|---|---|---|---|---|---|---|
| ROM UPPER ADDRESS (4BITS) HEXADECIMAL | 0 | 1 | 2 | 3 | 4 | 5 | 6 | 7 |
| 0 | 0 | 2 | 0 | 0 | 0 | 0 | 0 | 0 |
| 1 | 0 | 0 | 0 | 0 | 0 | 0 | 0 | 0 |
| 2 | 0 | 0 | 0 | 0 | 0 | 0 | 0 | 0 |
| 3 | 0 | 0 | 0 | 0 | 0 | 0 | 0 | 0 |
| 4 | 0 | 0 | 0 | 0 | 0 | 0 | 0 | 0 |
| 5 | 0 | 0 | 0 | 4 | 0 | 0 | 0 | 0 |
| 6 | 0 | 0 | 0 | 0 | 0 | 0 | 0 | 0 |
| 7 | 0 | 0 | 0 | 0 | 0 | 0 | 0 | 0 |
| 8 | 0 | 0 | 0 | 0 | 0 | 0 | 0 | 0 |
| 9 | 0 | 0 | 0 | 0 | 0 | 0 | 0 | 0 |
| A | 0 | 0 | 3 | 0 | 0 | 0 | 0 | 0 |
| B | 0 | 0 | 0 | 0 | 0 | 0 | 0 | 0 |
| C | 0 | 0 | 0 | 0 | 0 | 0 | 0 | 0 |
| D | 0 | 0 | 0 | 0 | 0 | 0 | 0 | 0 |
| E | 0 | 0 | 0 | 0 | 0 | 0 | 0 | 0 |
| F | 1 | 0 | 0 | 0 | 0 | 0 | 0 | 0 |

| CONTROL SIGNAL<br>FRAME No. | a | b | c |
|---|---|---|---|
| 0 | F | 0 | F |
| 1 | F | 0 | 0 |
| 2 | F | 0 | F |
| 3 |  |  | 0 |

FIG. 7

| ROM LOWER \ UPPER | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0 | 4 | 0 | 0 | 0 | 0 | 0 | 0 | 0 | 0 | 0 | 0 | 0 | 0 | 0 | 0 | 1 |
| 1 | 7 | 0 | 0 | 0 | 0 | 0 | 0 | 0 | 0 | 0 | 0 | 0 | 0 | 0 | 0 | 2 |
| 2 | 0 | 0 | 0 | 0 | 0 | 0 | 0 | 0 | 0 | 0 | 0 | 0 | 0 | 0 | 0 | 3 |
| 3 | 0 | 0 | 0 | 0 | 0 | 0 | 0 | 0 | 0 | 0 | 0 | 0 | 0 | 0 | 0 | 0 |
| 4 | 5 | 0 | 0 | 0 | 0 | 0 | 0 | 0 | 0 | 0 | 0 | 0 | 0 | 0 | 0 | 0 |
| 5 | 6 | 0 | 0 | 0 | 0 | 0 | 0 | 0 | 0 | 0 | 0 | 0 | 0 | 0 | 0 | 0 |
| 6 | 0 | 0 | 0 | 0 | 0 | 0 | 0 | 0 | 0 | 0 | 0 | 0 | 0 | 0 | 0 | 0 |
| 7 | 0 | 0 | 0 | 0 | 0 | 0 | 0 | 0 | 0 | 0 | 0 | 0 | 0 | 0 | 0 | 8 |
| 8 | 9 | 0 | 0 | 0 | 0 | 0 | 0 | 0 | 0 | 0 | 0 | 0 | 0 | 0 | 0 | 0 |
| 9 | 0 | 0 | 0 | 0 | 0 | 0 | 0 | 0 | 0 | 0 | 0 | 0 | 0 | 0 | 0 | 0 |
| A | 0 | 0 | 0 | 0 | 0 | 0 | 0 | 0 | 0 | 0 | 0 | 0 | 0 | 0 | 0 | 0 |
| B | 0 | 0 | 0 | 0 | 0 | 0 | 0 | 0 | 0 | 0 | 0 | 0 | 0 | 0 | 0 | 0 |
| C | 0 | 0 | 0 | 0 | 0 | 0 | 0 | 0 | 0 | 0 | 0 | 0 | 0 | 0 | 0 | 0 |
| D | 0 | 0 | 0 | 0 | 0 | 0 | 0 | 0 | 0 | 0 | 0 | 0 | 0 | 0 | 0 | 0 |
| E | 0 | 0 | 0 | 0 | 0 | 0 | 0 | 0 | 0 | 0 | 0 | 0 | 0 | 0 | 0 | 0 |
| F | 0 | 0 | 0 | 0 | 0 | 0 | 0 | 0 | 0 | 0 | 0 | 0 | 0 | 0 | 0 | 0 |

ROM LOWER ADDRESS (4BITS) HEXADECIMAL
ROM UPPER ADDRESS (4BITS) HEXADECIMAL

CIRCUIT WHICH DETECTS A SIGNAL IN SUCCESSIVE FRAMES BY FEEDING BACK LOOK UP DATA WITH ONE FRAME DELAY AS ADDRESSES TO LOOK UP MEMORY

BACKGROUND OF THE INVENTION

The present invention relates to a detection circuit for detecting a control signal, a frame synchronous signal or the like, and can be applied to a control signal detection circuit or a frame synchronous circuit.

In the data communication system, data streams transmitted from transmitters to receivers often include various control signals multiplexed with transmission data. For example, control signals for controlling a set state of a receiver may be transmitted from a transmitter along with transmission data in a data stream.

For detecting such control signals in the data stream, the following detection method is generally used.

The data stream transmitted from the transmitter forms a series of frames each having a given period T and each having a given number of time slots.

The transmitter transmits to the receiver the data stream in which each frame has a control signal as data 00 at a time slot X located in a given position. The receiver, upon detection of data 00 at the time slot X in one frame, fixes a position of a detection window as determining that the control signals exist at the time slots X in the frames of the data stream. Specifically, the receiver detects only the data at the time slot X in each frame, while it stops detecting data at the other time slots in each frame.

Accordingly, the receiver detects data at a time slot X in the next frame which is one period T after the time slot X in the current frame. If the data at the time slot X in the next frame is found to be other than 00, the receiver releases the current position of the detection window as determining that it was wrong to determine that the control signals exist at the time slots X in the frames of the data stream. Then, the receiver performs detection of data at all the time slots in the data stream in sequence for locating a time slot where data is 00.

On the other hand, if data at the time slot X in the next frame is 00, the receiver detects data at a time slot X in the further next frame which is one period T after the time slot X in the next frame.

As a result of the foregoing detection, in case data at a given number of the time slots located at an interval of the period T are all 00, the receiver recognizes that the control signals are transmitted at the time slots in such positions in the data stream.

However, in the foregoing detection method of the control signals, if data 00 equal to the control signal also exists at a time slot Y other than the time slot X in the data stream and if the receiver detects the time slot Y in advance of the time slot X, the receiver fixes a position of the detection window at the time slot Y. In this case, the position of the detection window is not released until data other than 00 is detected at a time slot Y which is one period T after the current time slot Y. This possibly takes much time until the time slot X where the control signal actually exists is correctly detected.

Further, in case data equal to the control signal exist at a plurality of the time slots other than the time slot X, even if the time slot X is first detected, since the data equal to the control signal are detected at a period other than the given period T, it takes much time to continuously detect the control signals at every given period T.

SUMMARY OF THE INVENTION

Therefore, it is an object of the present invention to provide an improved signal detection circuit which is capable of detecting a signal to be detected, such as a control signal or a frame synchronous signal, in a data stream with a simple structure and for a short time.

According to the present invention, a signal detection circuit receives a data stream containing a signal to be detected and detects the contained to-be-detected signal. The signal detection circuit includes a memory circuit prestoring data for detecting the to-be-detected signal, first data feeding means for feeding data to the memory circuit per given time slot as an upper address, and second data feeding means for feeding data to the memory circuit as a lower address using data outputted from the memory circuit. The memory circuit outputs data stored in a storage area defined by the upper address and the lower address fed from the first and second data feeding means, respectively.

By arranging the memory circuit to output a given value as the foregoing output data when the to-be-detected signal is detected, detection of the to-be-detected signal can be achieved.

DETAILED DESCRIPTION OF THE PREFERRED EMBODIMENTS

Now, preferred embodiments of the present invention will be described hereinbelow with reference to the accompanying drawings.

(First Embodiment)

Figure 1:
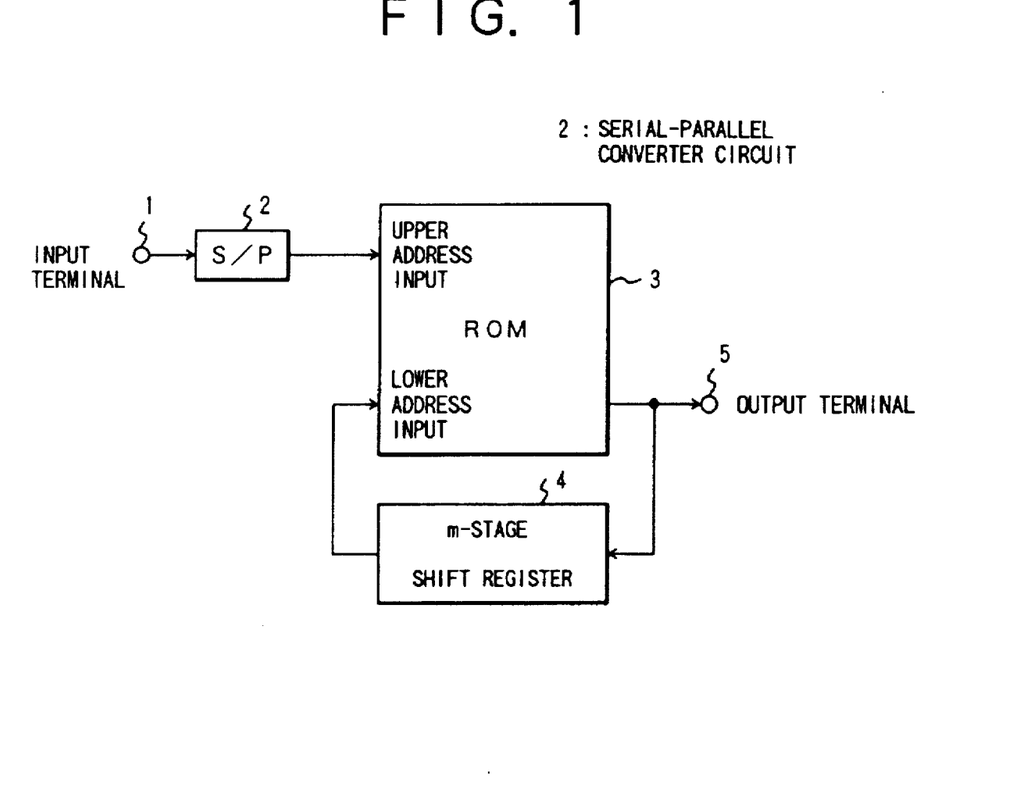
FIG. 1 is a structural diagram showing a functional structure of a first preferred embodiment according to the present invention.

FIG. 1 is a structural diagram showing a functional structure of a control signal detection circuit. In FIG. 1, the control signal detection circuit includes a serial-parallel (S/P) converter circuit 2, a ROM 3 and an m-stage shift register 4. A data stream containing multiplexed control signals is inputted as serial data to an input terminal 1 from which the serial data are fed to the S/P converter circuit 2.

Figure 4:
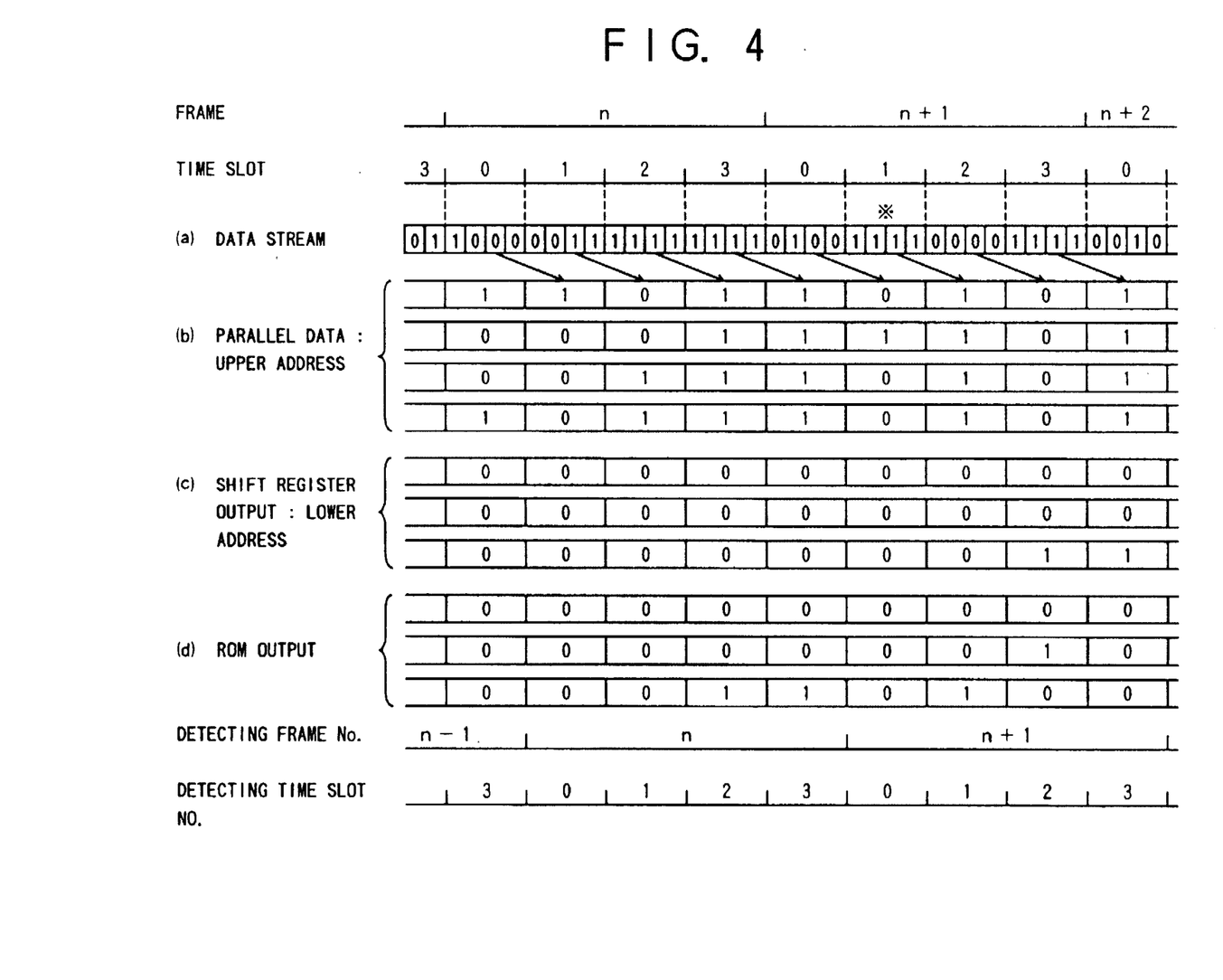
FIG. 4 is a time chart according to the first preferred embodiment.

In the serial data, as shown at (a) in FIG. 4, one frame is composed of 4 time slots and one time slot is composed of 4 bits. For example, data 1000 is set at time slot 0 in frame n, and a control signal 1111 is set at time slot 1 in frame n+1.

Figure 2:
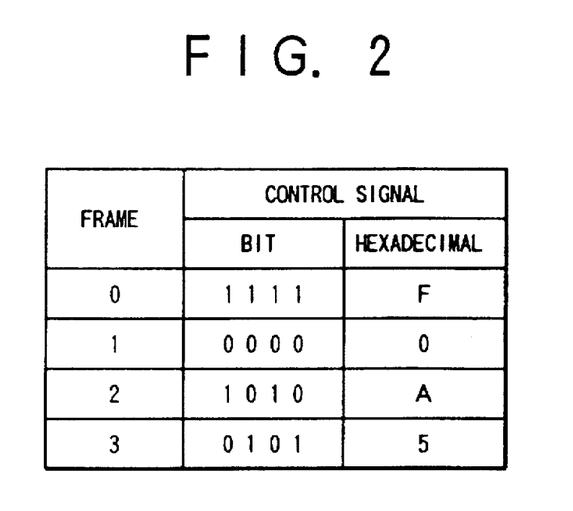
FIG. 2 is a table for explaining control signals used in the first preferred embodiment.

The control signals are formed by four frames as a unit and have different values, each composed of four bits, over the four frames. Specifically, as shown in FIG. 2, 1111 (F in hexadecimal) is set as a control signal in frame 0, 0000 (0 in hexadecimal) is set as a control signal in frame 1, 1010 (A in hexadecimal) is set as a control signal in frame 2, and 0101 (5 in hexadecimal) is set as a control signal in frame 3.

The reason why the control signal is set to a different bit value per frame is that a given control is performed using the control signals F, 0, A and 5 (in hexadecimal) for increasing a detection accuracy of the control signal as a signal to be detected, so as to prevent misjudging data other than the control signal to be a control signal.

Figure 5:
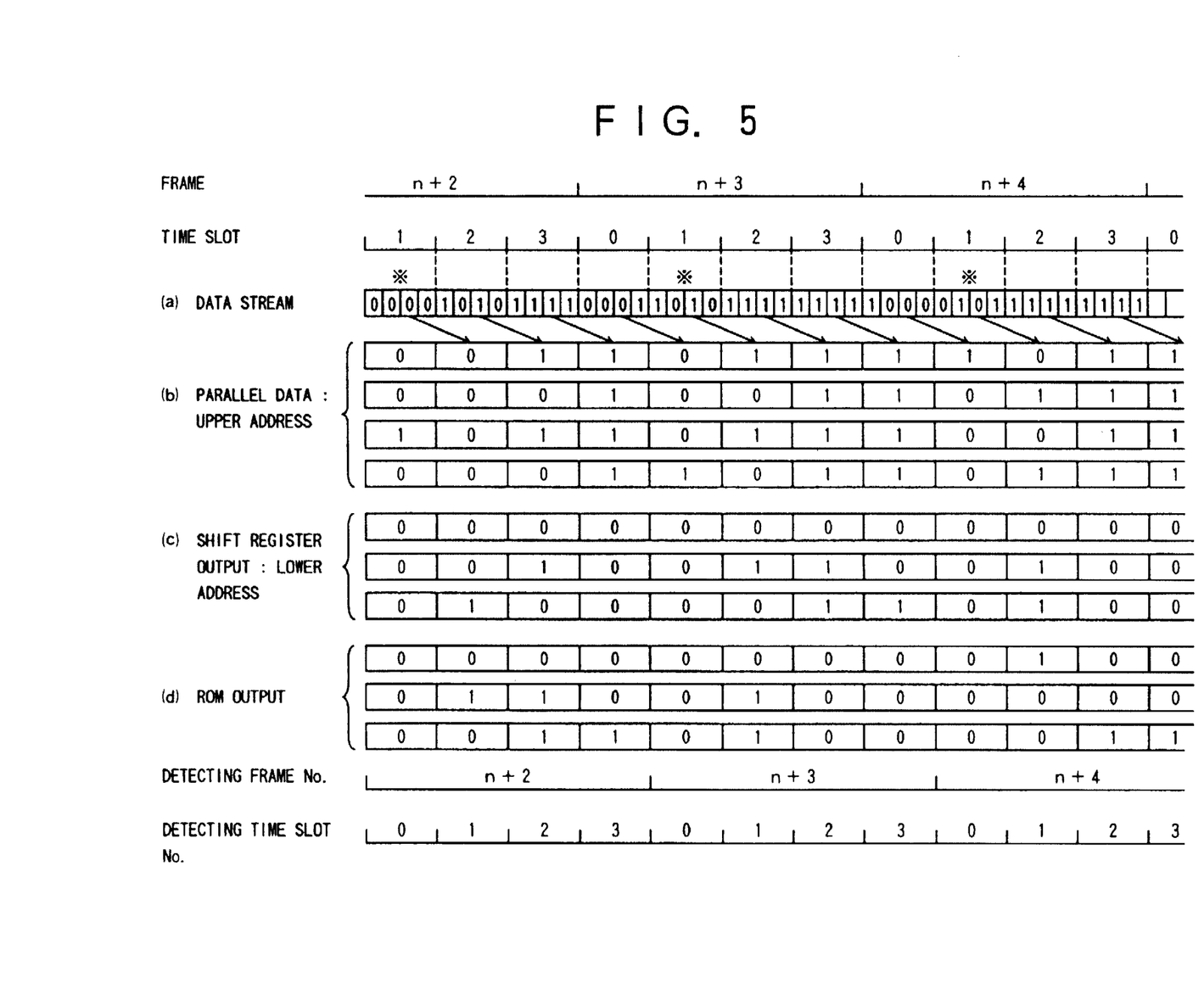
FIG. 5 is a time chart according to the first preferred embodiment.

In FIG. 4, the control signal 1111 (F in hexadecimal) is set at time slot 1 in frame n+1. In FIG. 5, the control signal 0000 (0 in hexadecimal) is set at time slot 1 in frame n+2. Further, in FIG. 5, the control signal 1010 (A in hexadecimal) is set at time slot 1 in frame n+3. Still further, in FIG. 5, the control signal 0101 (5 in hexadecimal) is set at time slot 1 in frame n+4.

Since one time slot is composed of 4 bits in serial data, the S/P converter circuit 2 converts each time slot in serial data to 4-bit parallel data as shown at (b) in FIGS. 4 and 5 and feed it to the ROM 3 as an upper address.

The ROM 3 receives the parallel data from the S/P converter circuit 2 as an upper address, while receiving 3-bit parallel data from the m-stage shift register 4 as a lower address. The ROM 3 outputs data stored in a storage area determined by the upper address and the lower address.

Figure 3:
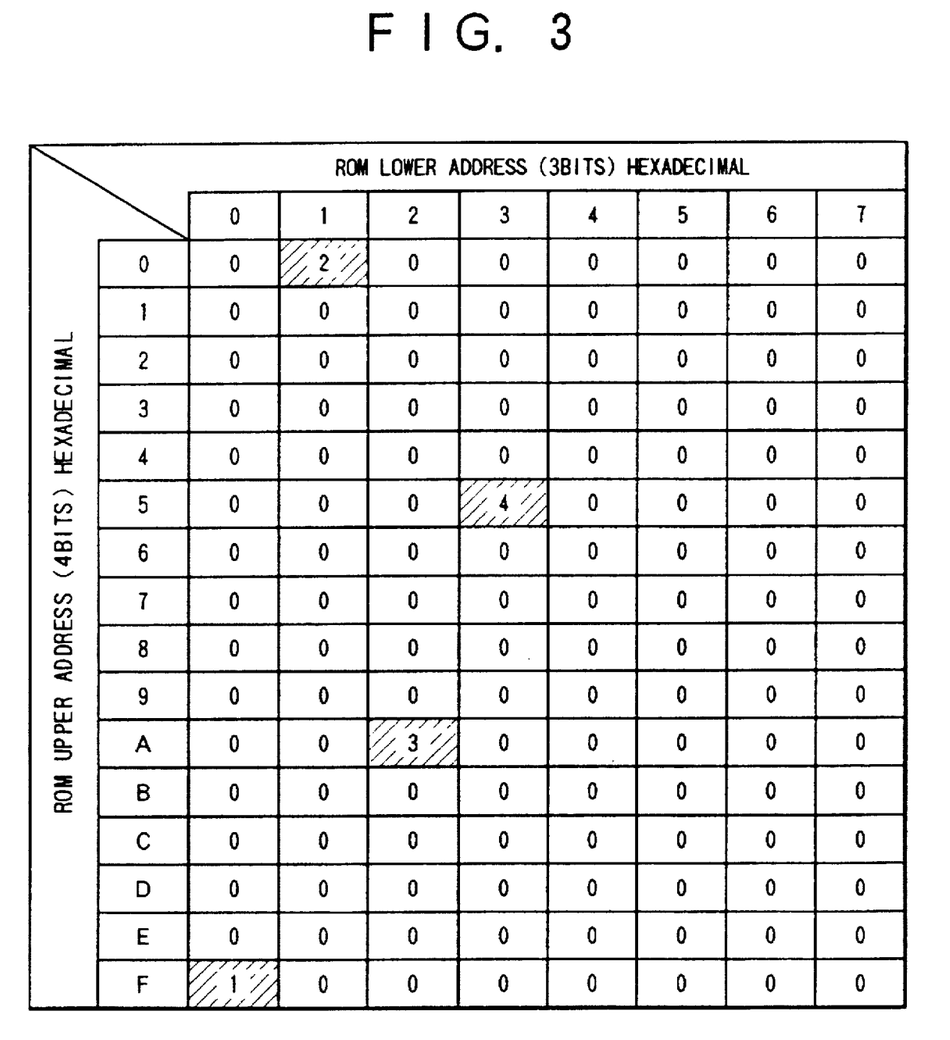
FIG. 3 is a table for explaining data stored in a ROM according to the first preferred embodiment.

FIG. 3 is a table for explaining the data stored in the ROM 3 according to the first preferred embodiment. In FIG. 3, the axis of ordinate represents upper addresses 0~F (in hexadecimal) and the axis of abscissa represents lower addresses 0~7 (in hexadecimal). For example, "1" is stored at address "F0", "2" is stored at address "01", "3" is stored at address "A2", "4" is stored at address "53". Further, "0" is stored at all the remaining addresses.

Since the ROM 3 stores the data as shown in FIG. 3, only when the data at the given time slots in the frames are in order of F→0→A→5, the ROM 3 outputs data in order of 1→2→3→4. This effectively prevents an occurrence of detection error, which will be described later.

As appreciated, the upper address of the ROM 3 is used for identifying a control signal, while the lower address of the ROM 3 is used for identifying a frame number of the control signal.

The ROM 3 outputs the data at an output terminal 5 as 3-bit parallel data as shown at (d) in FIGS. 4 and 5. The data outputted from the ROM 3 is also inputted to the m-stage shift register 4. "m" of the m-stage shift register represents the number of time slots in one frame. Thus, m=4 in this embodiment. Accordingly, as a 4-stage shift register, the shift register 4 shifts the data outputted from the ROM 3 for feeding to the ROM 3 as a lower address. This m-stage shift register 4 outputs "0" at an initial condition for feeding to the ROM 3 as a lower address.

Since data at time slot 1 in frame n is 0011 (3) and an output of the shift register 4 is 0, an address in the ROM 3 becomes "30" so that data 0 in the corresponding storage area is outputted based on the table of FIG. 3. This outputted data 0 is not detected as a control signal. The outputted data 0 is inputted to a first stage of the shift register 4 and fed to the ROM 3 as a lower address when data at time slot 1 in frame n+1 is inputted to the ROM 3 as an upper address.

A signal at time slot 1 in frame n+1 is 1111 (F) which is inputted to the ROM 3 as an upper address. Simultaneously, 0 is inputted to the ROM 3 as a lower address. Accordingly, an address in the ROM 3 becomes "F0" so that data 1 is outputted. This represents that the control signal 1111 (F) in frame 0, that is, in the first frame, was detected. The outputted data 1 is also inputted to the shift register 4.

A signal at time slot 1 in frame n+2 is 0000 (0) which is inputted to the ROM 3 as an upper address. Simultaneously, 1 is inputted to the ROM 3 as a lower address. Accordingly, an address in the ROM 3 becomes "01" so that data 2 is outputted. This represents that the control signal 0000 (0) in frame 1, that is, in the second frame, was detected. The outputted data 2 is also inputted to the shift register 4.

A signal at time slot 1 in frame n+3 is 1010 (A) which is inputted to the ROM 3 as an upper address. Simultaneously, 2 is inputted to the ROM 3 as a lower address. Accordingly, an address in the ROM 3 becomes "A2" so that data 3 is outputted. This represents that the control signal 1010 (A) in frame 2, that is, in the third frame, was detected. The outputted data 3 is also inputted to the shift register 4.

A signal at time slot 1 in frame n+4 is 0101 (5) which is inputted to the ROM 3 as an upper address. Simultaneously, 3 is inputted to the ROM 3 as a lower address. Accordingly, an address in the ROM 3 becomes "53" so that data 4 is outputted. This represents that the control signal 0101 (5) in frame 3, that is, in the fourth frame, was detected.

In the foregoing manner, when the four control signals formed by the four flames are all detected normally, the most significant bit of the output of the ROM 3 becomes 1 as representing a detection completion signal and this signal is outputted from the output terminal 5.

Even if data other than the control signal is equal to the control signal accidentally, since the ROM 3 is arranged to output data 0 unless the four control signals formed by the four flames are all detected normally, a possibility of occurrence of misjudgment can be largely reduced.

For example, data at time slots 2 are F in frame n, 0 in frame n+1 and A in frame n+2. Accordingly, the signals equal to the control signals are detected up to frame 2, that is, to the third frame. However, since data at time slot 2 in the next frame n+3 is F, an address in the ROM 3 becomes "F3" so that data 0 is outputted. Accordingly, detection of F in frame 0, that is, in the first frame, is started in the next frame n+4.

In this preferred embodiment, it is arranged that the detection of the control signals is performed independently in parallel with respect to time slots 0-3. For example, the data detection is also performed with respect to time slot 0 in parallel with the foregoing data detection with respect to time slot 1. Since data at time slots 0 in frames n~n+4 differ from F which represents a control signal in frame 0, the detection of F continues constantly.

As described above, even if the agreement is achieved part of the way, since the data in the ROM 3 are so arranged that data F representing the control signal in frame 0 is always detected in a frame next to a frame where data different from the control signal is inputted, the detection completion signal is not outputted from the ROM 3 unless the control signals are detected normally in the given order over the four frames. In this manner, presence or absence of the control signal can be confirmed in serial with respect to all the time slots.

Accordingly, even if data equal to the control signals are detected at time slots Y (for example, time slot 2) in some frames other than at time slots X (for example, time slot 1) where the control signals are actually transmitted, the existence of the control signals at time slots X can be determined immediately upon receiving the control signals continuously over all the given frames (for example, 4 frames). Thus, the control signals can be detected quickly for a short time with high accuracy and with a simple structure.

(Second Embodiment)

In the foregoing first embodiment, one time slot is composed of 4 bits and one frame is composed of 4 time slots (16 bits) in the data stream, and further, the control signals are in a pattern formed by the four frames. On the other hand, in the second embodiment, explanation will be made referring to a more generalized structure.

Specifically, in case one time slot is composed of L bits, an output of the S/P converter circuit 2 is set to be composed of L bits and an upper address of the ROM 3 is set to be composed of L bits. Similarly, in case one frame is composed of P time slots, the number of shift stages of the shift register 4 is set to P.

Further, in case the control signals are formed by Q frames, assuming that the number of bits which can express Q-1 in binary digit is R, an output of the ROM 3, an input and an output of the m-stage shift register 4 and a lower address of the ROM 3 are set to be composed of R+1 bits, respectively.

Further, a capacity of the ROM 3 is set such that the number of upper address input lines is 2L and the number of lower address input lines is 2(R+1). For example, when L=8 and Q=128, the number of upper addresses is set to 256 (FF in hexadecimal) and the number of lower addresses is set to 256 (FF in hexadecimal). It is further arranged that values of the control signals correspond to the upper addresses, frame numbers of the control signals correspond to the lower addresses (frame number starts from 0 as in FIG. 2), and data of (frame number+1) are stored in the ROM 3 corresponding to the respective control signals.

The last frame Q-1 is written so that the most significant bit of the data output of the ROM 3 becomes 1, which is used as the detection completion signal. It is preferable that 0 is stored as data in all the addresses which are not used for detection of the control signals, for ensuring the reliable detection of the control signals.

With the foregoing structure, irrespective of a bit length of one time slot, the number of time slots in one frame and the number of frames forming the control signals, presence or absence of the control signal can be confirmed in serial with respect to all the time slots, and even if data equal to the control signals are detected at time slots Y in some frames other than at time slots X where the control signals are actually transmitted, the existence of the control signals at time slots X can be determined immediately upon receiving the control signals continuously over all the given frames. Thus, the control signals can be detected quickly for a short time with high accuracy and with a simple structure.

(Third Embodiment)

In the foregoing first and second embodiments, the control signals are only in one pattern. On the other hand, even if the control signals are in a plurality of patterns, it can be easily dealt with by increasing the lower addresses of the ROM.

Figure 6:
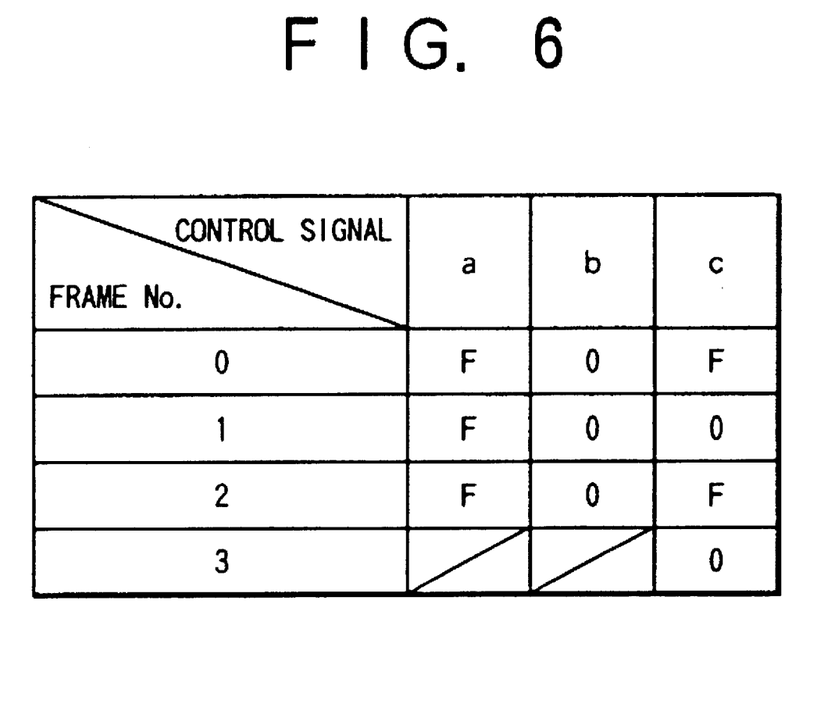
FIG. 6 is a table for explaining control signals used in a third preferred embodiment according to the present invention.
Figure 7:
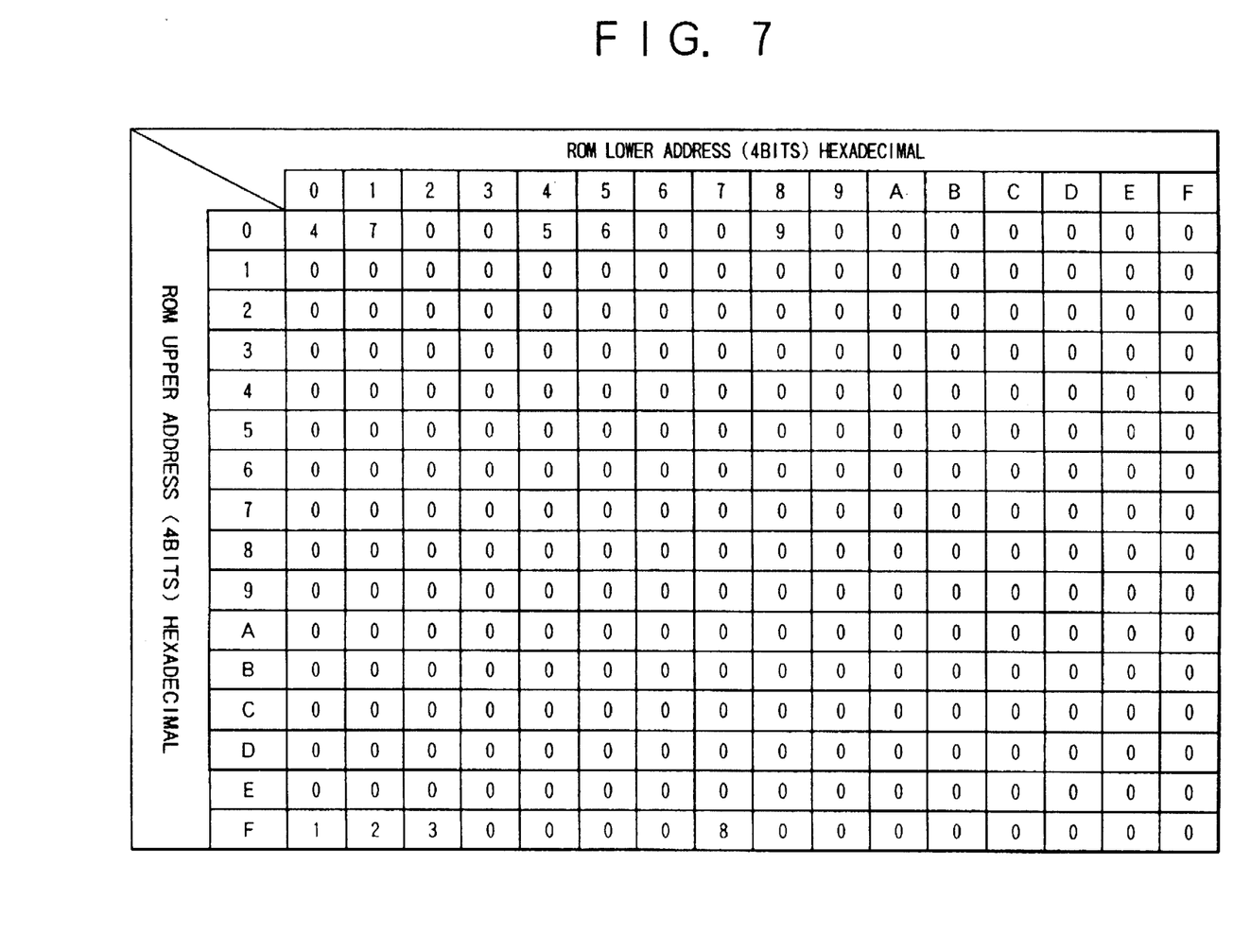
FIG. 7 is a table for explaining data stored in a ROM according to the third preferred embodiment.

FIG. 6 is a table showing three kinds of patterns of the control signals to be used in this embodiment. FIG. 7 is a table showing the data stored in the ROM corresponding to FIG. 6.

In FIG. 7, the control signals a transit addresses "F0"→"F1"→"F2", and the detection thereof is completed when data 3 in a storage area of the ROM defined by "F2" is outputted. On the other hand, the control signals b transit addresses "00"→"04"→"05", and the detection thereof is completed when data 6 in a storage area of the ROM defined by "05" is outputted. Further, the control signals c transit addresses "F0"→"01"→"F7"→"08", the detection thereof is completed when data 9 in a storage area of the ROM defined by "08" is outputted.

As described above, by storing and setting the lower addresses of the ROM for the control signals a, b and c, respectively, the control signals can be accurately detected without misjudgment.

For example, since the control signals a and c both have F in frame 0, that is, the first frame, they both take address "F0". However, since they take different addresses "F1" and "01" in frame 1, that is, the second frame, no misjudgment is caused. In this manner, the detection of the plural control signals can be achieved.

Although the ROM is used in the foregoing embodiments, a RAM may also be used for storing the data instead of the ROM.

Further, by monitoring the control signal (at least equal to or more than one bit), presence or absence of transmission abnormality (necessity of safeguard) can be determined. Accordingly, by adding a structure for switching a transmission mode to a safeguard mode or the like, a transmission device or a transmission system can be realized. The safeguard mode is, for example, a transmission method to be effective for countermeasure at the time of occurrence of transmission abnormality or the like. As the transmission device and the transmission system as noted above, a transcoder and a DACS (digital access cross-connect system) can be enumerated.

Further, in the foregoing embodiments, the upper address of the ROM is used for identifying the control signal and the lower address is used for identifying the frame number. On the other hand, contrary to this arrangement, it may also be arranged that the lower address of the ROM is used for identifying the control signal and the upper address is used for identifying the frame number so as to detect the control signal.

Further, in the foregoing embodiments, the control signal is monitored. On the other hand, the present invention can also be applied to a frame synchronous circuit, wherein a data stream includes a frame synchronous signal in a frame. Specifically, for detecting a frame synchronous signal in each frame, instead of the control signal, as a signal to be detected, it may be arranged that the data stream is inputted per time slot equal to the frame synchronous signal and a frame synchronous trigger signal is outputted instead of the detection completion signal, using ROM data similar to the foregoing ROM data. With this arrangement, the frame synchronous circuit which can quickly achieve the frame synchronous trigger signal is realized with a very simple structure.

What is claimed is:

1. A signal detection circuit which receives a data stream containing a signal to be detected, the data stream having frames with P time slots, each time slot having L bits, for detecting said contained to-be-detected signal, said circuit comprising:

a memory circuit presenting data for detecting said to-be-detected signal and for outputting, based on first and second data inputted as first and second addresses, respectively, data stored in a corresponding storage area;

a serial to parallel converter circuit for serial to parallel converting the data stream into L bit outputs and feeding input data from said converted data stream to said memory circuit as said first data; and a P-stage shift register for shifting the output data from said memory circuit, and feeding said shifted output data from said memory circuit to said memory circuit as said second data;

said memory circuit outputting a given signal as said output data when said first data is said to-be-detected signal.

2. The signal detection circuit according to claim 1, wherein said first address is a upper address and said second address is a lower address.

3. The signal detection circuit according to claim 2, wherein said to-be-detected signal is a control signal.

4. The signal detection circuit according to claim 2, wherein said to-be-detected signal is a frame synchronous signal.

5. The signal detection circuit according to claim 1, wherein said first address is a lower address and said second address is an upper address.

6. The signal detection circuit according to claim 5, wherein said to-be-detected signal is a control signal.

7. The signal detection circuit according to claim 5, wherein said to-be-detected signal is a frame synchronous signal.

8. A signal detection circuit which receives a data stream in the form of a plurality of frames in succession each having a given number of time slots, for detecting a signal to be detected which exists at a given time slot in each of said frames, said circuit comprising:

a memory circuit prestoring data for detecting said-to-be-detected signal and for outputting, based on first and said second data inputted as a first and second addresses, respectively, data stored in a corresp9nding storage area;

first data feeding means for feeding data inputted from said data stream per said time slot to said memory circuit as said first data; and second data feeding means for feeding said output data from said memory circuit to said memory circuit as said second data with a delay of one frame, said memory circuit outputting a given signal as said output data when said first data is said to-be-detected signal;

wherein:

said frame is composed of P time slots and each said time slot is composed of L bits;

said first data feeding means has a serial to parallel converter circuit for serial to parallel converting the data stream into L bit outputs; and said second data feeding means comprises a P-stage shift register.

9. The signal detection circuit according to claim 8, wherein said output data outputted from said memory circuit when said data inputted per said time slot is the same as said to-be-detected signal, differs from said output data outputted from said memory circuit when said data inputted per said time slot differs from said to-be-detected signal.

10. The signal detection circuit according to claim 9, wherein said first address is an upper address and said second address is a lower address.

11. The signal detection circuit according to claim 10, wherein said to-be-detected signal is a control signal.

12. The signal detection circuit according to claim 10, wherein said to-be-detected signal is a frame synchronous signal.

13. The signal detection circuit according to claim 9, wherein said first address is a lower address and said second address is an upper address.

14. The signal detection circuit according to claim 13, wherein said to-be-detected signal is a control signal.

15. The signal detection circuit according to claim 13, wherein said to-be-detected signal is a frame synchronous signal.

\* \* \* \* \*